(12) United States Patent
Mathur et al.

(10) Patent No.: US 8,793,246 B1
(45) Date of Patent: Jul. 29, 2014

(54) IDENTIFYING RANKING SCORES FOR DOMAINS OF INTEREST

(71) Applicants: Monika Verma Mathur, Karnataka (IN); Argha Bose, Karnataka (IN)

(72) Inventors: Monika Verma Mathur, Karnataka (IN); Argha Bose, Karnataka (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/791,331

(22) Filed: Mar. 8, 2013

(51) Int. Cl.
*G06F 7/00* (2006.01)
*G06F 17/30* (2006.01)

(52) U.S. Cl.
CPC .............................. *G06F 17/30864* (2013.01)
USPC ........... 707/723; 707/737; 707/748; 709/218; 709/242; 706/10

(58) Field of Classification Search
None
See application file for complete search history.

(56) References Cited

U.S. PATENT DOCUMENTS

| | | | |
|---|---|---|---|
| 6,560,590 B1 * | 5/2003 | Shwe et al. .................... 706/55 |
| 7,965,207 B2 | 6/2011 | Hendrickson | |
| 8,060,580 B2 | 11/2011 | Hendrickson et al. | |
| 8,180,774 B2 | 5/2012 | Hendrickson et al. | |
| 8,359,309 B1 * | 1/2013 | Provine et al. ................ 707/721 |
| 2002/0143744 A1 * | 10/2002 | Teng et al. ........................ 707/2 |
| 2002/0169764 A1 * | 11/2002 | Kincaid et al. .................... 707/3 |
| 2002/0198869 A1 | 12/2002 | Barnett | |
| 2008/0097891 A1 * | 4/2008 | Park ................................ 705/37 |
| 2008/0201304 A1 * | 8/2008 | Sue .................................... 707/3 |
| 2010/0085223 A1 | 4/2010 | Hendrickson | |
| 2010/0088352 A1 | 4/2010 | Hendrickson et al. | |
| 2010/0088428 A1 | 4/2010 | Hendrickson et al. | |
| 2010/0241624 A1 * | 9/2010 | Ramsey ........................ 707/732 |
| 2012/0016963 A1 | 1/2012 | Hendrickson et al. | |
| 2012/0124519 A1 * | 5/2012 | Uphoff et al. ................. 715/811 |
| 2012/0209849 A1 | 8/2012 | Hendrickson et al. | |

OTHER PUBLICATIONS

"Rankchecker," [online] 2006-2011, [retrieved on Mar. 8, 2013] http://www.rankchecker.com/pagerank-checker, 2006-2011.

* cited by examiner

*Primary Examiner* — Fred I Ehichioya
*Assistant Examiner* — Hasanul Mobin
(74) *Attorney, Agent, or Firm* — Fish & Richardson P.C.

(57) ABSTRACT

A computer-implemented method comprising: receiving information indicative of a keyword; receiving information indicative of a domain of interest; identifying, by one or more computer systems, a predefined number of search results for the keyword, with the identified search results having increased ranking scores, relative to other ranking scores of other search results for the keyword; determining, by the or more computer systems, from the search results a ranking score of a search result that is for the keyword and that is associated with the domain of interest; and transmitting, to a computing device that sent the information indicative of the domain of interest, information indicative of the identified search results with the increased ranking scores and information indicative of the ranking of the search result that is associated with the domain of interest.

17 Claims, 7 Drawing Sheets

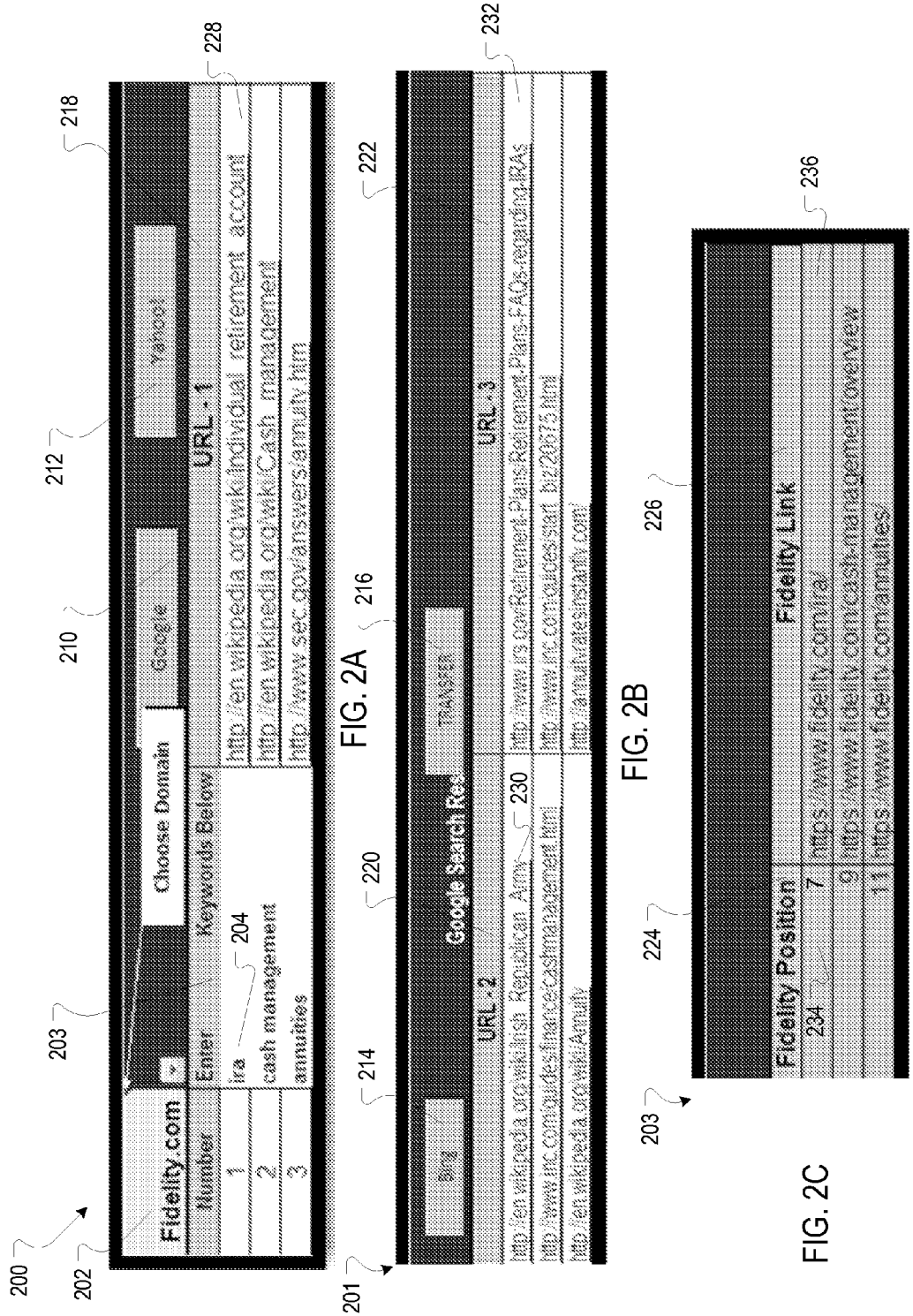

IDENTIFYING RANKING SCORES FOR DOMAINS OF INTEREST

BACKGROUND

This invention generally relates to computer-based retrieval of search results.

A system such as a computer-based system may retrieve, from a search engine system, search results that are retrieved based on a search term (e.g., a keyword). A search result includes information describing contents of an Internet domain that is relevant to the search term.

SUMMARY

In general, in one aspect, a computer-implemented method comprises: receiving information indicative of a keyword; receiving information indicative of a domain of interest; identifying, by one or more computer systems, a predefined number of search results for the keyword, with the identified search results having increased ranking scores, relative to other ranking scores of other search results for the keyword; determining, by the or more computer systems, from the search results a ranking score of a search result that is for the keyword and that is associated with the domain of interest; and transmitting, to a computing device that sent the information indicative of the domain of interest, information indicative of the identified search results with the increased ranking scores and information indicative of the ranking of the search result that is associated with the domain of interest.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. Implementations may include one or more of the following features. In some implementations, identifying the search results with the increased ranking scores comprises: receiving, from a search engine system, the predefined number of search results for the keyword with increased ranking scores. In other implementations, the search engine system comprises a first search engine system, wherein the search results for the keyword with the increased ranking scores comprise first search results, and the method further comprises: receiving, from a second search engine system, the predefined number of second search results for the keyword with increased ranking scores, relative to other ranking scores of other second search results for the keyword; determining, by the or more computer systems, a ranking score of a search result of the second search engine system that is for the keyword and that is associated with the domain of interest; and transmitting, to the computing device that sent the information indicative of the domain of interest, information indicative of the identified second search results with the increased ranking scores and information indicative of the ranking of the search result of the second search engine system that is associated with the domain of interest.

In still other implementations, the method includes generating a graphical user interface that when rendered on a display device, renders: a first visual representation of the information indicative of the identified first search results with the increased ranking scores and information indicative of the ranking of the search result for the first search engine system that is associated with the domain of interest; and a second visual representation of the information indicative of the identified second search results with the increased ranking scores and information indicative of the ranking of the search result for the second search engine system that is associated with the domain of interest, with the first visual representation being juxtaposed to the second visual representation.

In still other implementations, the method includes generating a graphical user interface that when rendered on a display device, renders: a first visual representation of a first control, selection of which causes the one or more computer systems to use a first search engine system in identifying the predefined number of search results with the increased ranking scores and in identifying the ranking score of the search result that is for the keyword and that is associated with the domain of interest; and a second visual representation of a second control, selection of which causes the one or more computer systems to use a second search engine system in identifying the predefined number of search results with the increased ranking scores and in identifying the ranking score of the search result that is for the keyword and that is associated with the domain of interest, with the first search engine system differing from the second search engine system.

In yet other implementations, the method includes transmitting, to the computing device that sent the information indicative of the domain of interest, information indicative of the ranking scores for the identified search results with the increased ranking scores. In still other implementations, the method includes retrieving, from a search engine system, search results for the keyword. In some implementations, identifying the predefined number of search results for the keyword comprises: selecting, from the retrieved search results, the predefined number of search results with increased ranking scores, relative to other ranking scores of other of the retrieved search results. In other implementations, identifying the ranking score of the search result that is for the keyword and that is associated with the domain of interest comprises: selecting, from the retrieved search results, a search result for the domain of interest; and determining, based on a ranking of the selected search result relative to other search results in the retrieved search results, the ranking score of the selected search result.

BRIEF DESCRIPTION OF THE FIGURES

FIGS. 2A-2C are examples of graphical user interfaces presented to a user of the ranking retrieval system.

DETAILED DESCRIPTION

Figure 1:
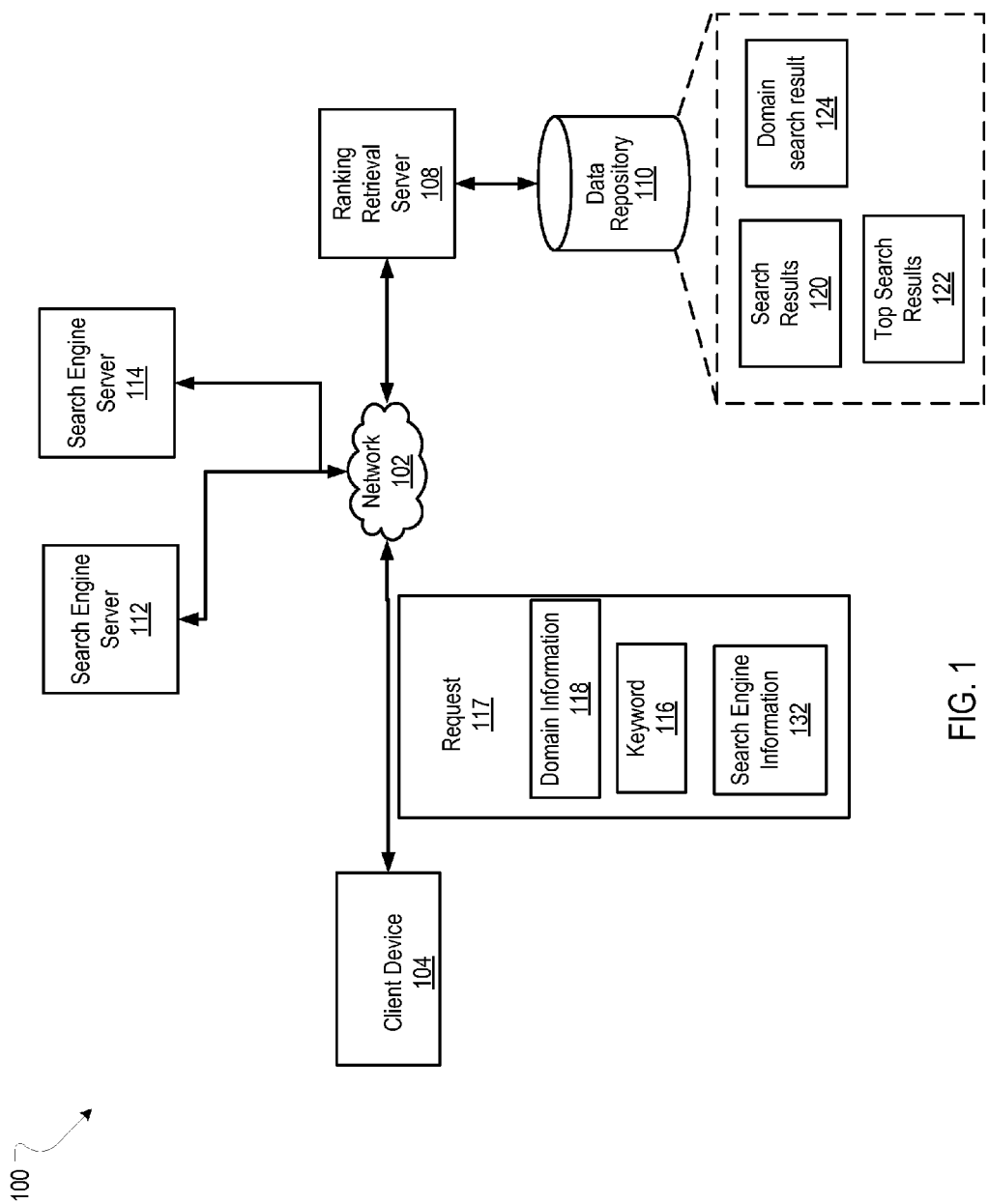
FIG. 1 is a diagrammatic view of a ranking retrieval system.

Referring now to FIG. 1, an example system 100 implementing a ranking retrieval service is shown. System 100 includes a network 102, a client device 104, a ranking retrieval server 108, search engine servers 112, 114 and a data repository 110. A user (not shown) uses client device 104 to access the ranking retrieval server 108 via the network 102. The client device 104 and the ranking retrieval server 108 communicate with each other over network 102 and can run programs having a client-server relationship to each other.

Client device 104 sends request 117 to ranking retrieval server 108. Request 117 includes domain information 118, which is information indicative of a domain (e.g., an Internet domain) and/or information indicative of a uniform resource location (URL). Request 117 also includes keyword 116. Request 117 is a request for search results (e.g., top search results) that are retrieved based on keyword 116 and a request for respective ranking of these search results. A top search result is a search result with an increased ranking score, relative to other ranking scores of other search results. A ranking score is a value indicative of a placement of an item relative to placements of other items of information in a list of ordered information. In an example, top search results are the top three search results that are returned, in response to a search query. A search engine may also generate a search engine score (e.g., a relevance score) that is used by the search engine in selecting search results for display to a user and/or in ranking the search results relative to each other.

In an example, the ranking score that is generated by ranking retrieval server 108 differs from the search engine score that is generated by a search engine. For example, the ranking score is generated by ranking retrieval server 108 to identify an order in which search results are displayed to a user. That is, the ranking score specifies a position of a search result in an ordered list of search results that are viewed by a user. In another example, a search engine may transmit, to ranking retrieval server 108, information indicative of the search engine scores of search results that are retrieved from the search engine. In this example, ranking retrieval server 108 may use the search engine scores in generating the ranking scores, e.g., by weighting the ranking scores in accordance (and/or based on) the search engine scores, by adding the search engine scores to the ranking scores, or by applying a mathematical operation to the search engine scores and the ranking scores to generate a new value that is used displayed for the user.

Request 117 is also a request for a ranking of a search result that is associated with domain information 118 and that is retrieved based on keyword 116. Request 117 also includes search engine information 132, e.g., information specifying a search engine from which to request the search results. A user of client device 104 initiates transmission of request 117, e.g., to identify a ranking of a search result for a particular domain relative to rankings of top search results.

Ranking retrieval system 108 receives request 117. Using search engine information 132, ranking retrieval system 108 determines which of search engine servers 112, 114 to access for the requested search results. Search engine information 132 specifies a name of a search engine (e.g., Google™, Yahoo!®, Bing™, and so forth) to be used for retrieval of search results. In the example of FIG. 1, search engine information 132 specifies that search engine server 112 is to be used for retrieval of search results.

Ranking retrieval server 108 generates a search query (not shown) for search results that are retrieved based on keyword 116. Ranking retrieval server 108 sends the search query to search engine server 112. In response, search engine server 112 generates search results 120 that are retrieved based on the search query and keyword 116. Search results 120 include SEO search results, as described in further detail below. Search engine server 112 transmits search results 120 to ranking retrieval server 108. Ranking retrieval server 108 stores search results 120 in data repository 110.

From search results 120, ranking retrieval server 108 selects a pre-defined number of top search results 122. In an example, request 117 may include information specifying the pre-defined number of top search results 122. In another example, ranking retrieval server 108 is configured with the pre-defined number. Ranking retrieval server 108 also determines ranking scores for top search results 122. Ranking retrieval server 108 determines which one of top search results 122 is ranked first, which one of top search results 122 is ranked second, and so forth.

Ranking retrieval server 108 parses top search results 122 to determine if one or more of top search results 122 are for domain information 118. For example, domain information 118 includes a URL. In this example, ranking retrieval server 108 parses top search results 122 to determine if one or more of top search results 122 include the URL of domain information 118.

If ranking retrieval server 108 determines that one or more of top search results 122 are for domain information 118, ranking retrieval server 108 assigns the determined one or more of top search results 122 to be domain search result 124. Domain search result 124 is a search result that is associated with keyword 116 and that is also associated with (e.g., retrieved based on and/or relevant to) domain information 118.

If ranking retrieval server 108 is unable to determine that one or more of top search results 122 are for domain information 118, ranking retrieval server 108 parses a reminder of search results 120 for domain search result 124. Ranking retrieval server 108 transmits, to client device 104, information indicative of top search results 122 and domain search result 124 that is associated with domain information 118. Ranking retrieval server 108 also transmits, to client device 104, information indicative of ranking scores of top search results 122 and a ranking score for domain search result 124.

Referring to FIGS. 2A-2C, graphical user interfaces 200, 201, 203 show an example of various top search results for various keywords and ranking scores for domain search results that are associated with the various keywords and with a particular domain. Graphical user interface 200 includes portion 202 for entry of information indicative of a domain of interest, e.g., a domain to be used in identifying domain search results. Graphical user interface 200 includes portion 203 for entry of keywords to be used in retrieving search results. Graphical user interface 200 includes controls 210, 212 and graphical user interface 201 includes control 214. Controls 210, 212, 214 are for selecting a particular search engine from which to access search results. Graphical user interface 200 includes portion 218 for display of information (e.g., a URL) related to search results with highest ranking scores, e.g., relative to ranking scores of other search results. Graphical user interface 201 includes portion 220 for display of information related to search results with second highest ranking scores, e.g., relative to ranking scores of other search results and relative to the highest ranking scores. Graphical user interface 201 includes portion 222 for display of information related to search results with third highest ranking scores, e.g., relative to ranking scores of other search results and relative to the second highest and the highest ranking scores. Portions 218, 220, 222 display a ranking score (e.g., URL-1, URL-2, URL-3) that is associated with the information displayed in portions 218, 220, 222, respectively. Graphical user interface 201 also includes control 216, selection of which causes contents of one or more of portions 202, 203, 218, 220, 222, 224, 226 to be transferred to a document (e.g., a spreadsheet).

Graphical user interface 203 includes portion 224 for display of information indicative of a ranking score of a domain search result for a keyword, e.g., relative to other ranking scores for other search results for the keyword. Graphical user interface 203 also includes portion 226 for display of information indicative of access information (e.g., a URL) that is included in a domain search result.

Ranking retrieval server 108 (FIG. 1) generates graphical user interfaces 200, 201, 203 and transmits one or more of graphical user interfaces 200, 201, 203 to client device 104, e.g., for display on client device 104. A user in client device 104 inputs a domain name (e.g., a keyword of fidelity.com) into portion 202 and various keywords into portion 203. One of the input keywords includes keyword 204 (e.g., a keyword of IRA).

Ranking retrieval server 108 also receives a selection of one of controls 210, 212, 214, e.g., to specify which search engine is used in retrieving search results. In the example of FIG. 2A, the user of client device 104 selects control 210. Selection of control 210 causes ranking retrieval server 108 to receive a request for top search results for keyword 204, with the top search results being generated by the search engine specified by control 210. Selection of control 210 also causes ranking retrieval server 108 to receive a request for a ranking score for a domain search result for keyword 204, with the domain search result being generated by the search engine specified by control 210 and being associated with the information input into portion 202. Following receipt of the requests, ranking retrieval server 108 retrieves, from the specified search engine, search results that are retrieved based on keyword 204.

Figure 2:
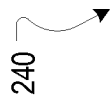
FIG. 2 is an example of an arrangement of graphical user interfaces.

Referring to FIG. 2, retrieval ranking server 108 generates arrangement 240, in which graphical user interfaces 200, 201, 203 of FIGS. 2A-2C, respectively, (or some combination thereof) are arranged in juxtaposition (i.e., next to) to each other. Ranking retrieval server 108 sends arrangement 240 to client device 104, e.g., for display on a display of client device 104 in a single graphical user interface.

Figure 3:
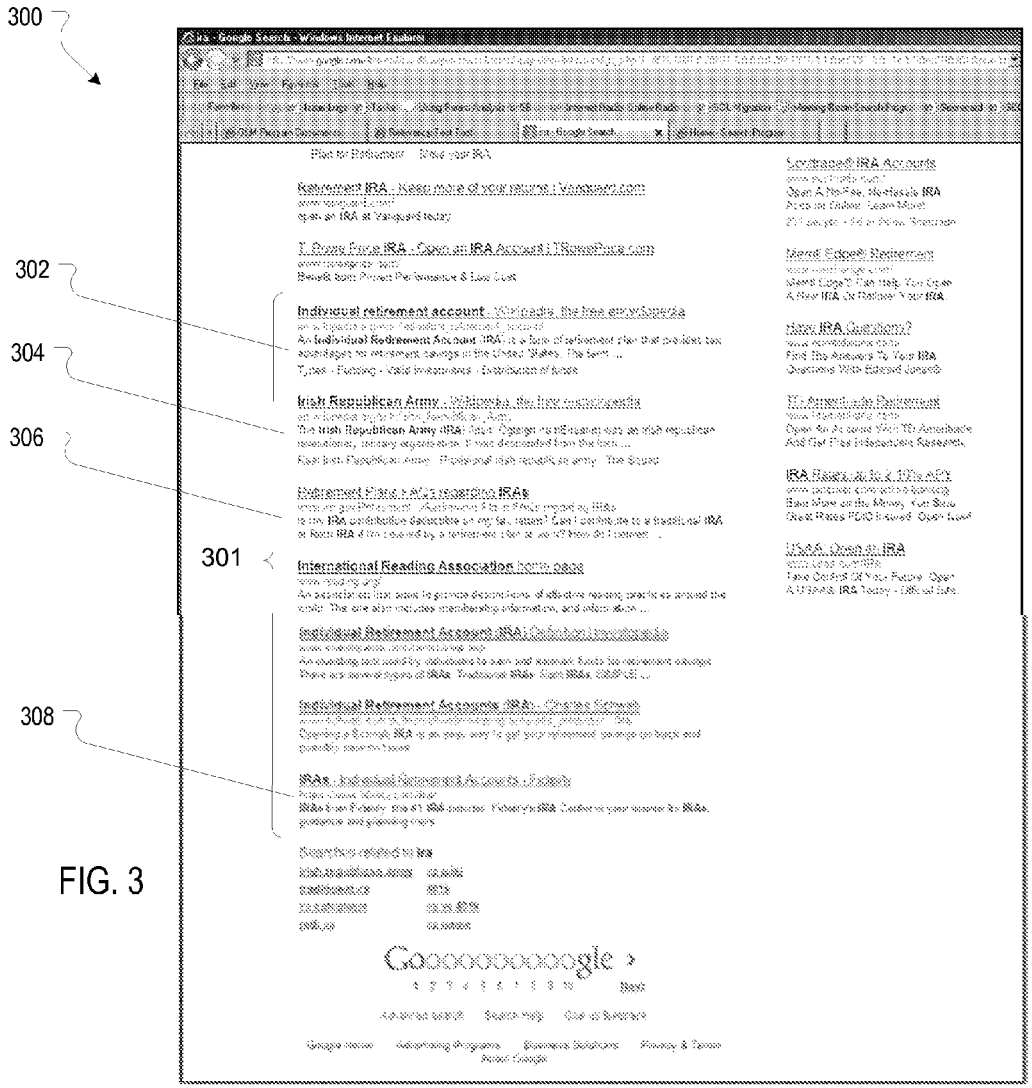
FIG. 3 is an example of a graphical user interface presented to a user of a search engine system.

Referring to FIG. 3, graphical user interface 300 shows search results 301 that are generated by a selected search engine and that are associated with keyword 204. Search results 301 include SEO search results. Search results 301 include the top three search results 302, 304, 306 that are generated by a selected search engine (e.g., via control 210) and that are associated with keyword 204. Referring back to FIGS. 2A-2C, ranking retrieval server 108 selects information 228, 230, 232 from contents of search results 302, 304, 306, respectively. Ranking retrieval server 108 causes portions 218, 220, 220 to be populated with information 228, 230, 232, respectively. Information 228 includes a URL of a first ranked search result, e.g., that is retrieved based on keyword 204 and that is generated by the search engine associated with control 210. Information 230 includes a URL of a second ranked search result, e.g., that is retrieved based on keyword 204 and that is generated by the search engine associated with control 210. Information 232 includes a URL of a third ranked search result, e.g., that is retrieved based on keyword 204 and that is generated by the search engine associated with control 210.

From search results 301 that are retrieved from the specified search engine, ranking retrieval server 108 identifies domain search result 308, e.g., a search result that is retrieved based on keyword 204 and that is associated with the domain name included in portion 202. Ranking retrieval server 108 identifies a ranking score of domain search result 308, e.g., based on a position of domain search result 308 among search results 301. Domain search result 308 is ranked seventh among search results 301.

Referring back to FIG. 2C, ranking retrieval server 108 populates portion 224 with ranking score 234 for domain search result 308 (FIG. 3). Ranking retrieval server 108 also populates portion 226 with access information 236 for domain search result 308. Access information 236 includes a URL that is included in domain search result 308.

In FIG. 2A, multiple keywords may be entered into portion 203. When multiple keywords are entered into portion 203, ranking retrieval system 108 displays, for each of the keywords, top search results and ranking scores of domain search results. The search results and ranking scores of domain search results are displayed in juxtaposition to each other, e.g., to promote a comparison of the ranking scores of the domain search results relative to the ranking scores of the top search results. In a variation of FIGS. 2A-2C, a graphical user interface may display top search results and ranking scores of domain search results for multiple different search engines, e.g., to promote a comparison of top search results and ranking scores of domain search results among the different search engines.

Ranking retrieval server 108 retrieves search results in real-time from search engines, e.g., rather than caching search results. Based on the real-time retrieval, ranking retrieval server 108 may retrieve a particular first set of search results and may retrieve a second, different set of search results a few seconds after retrieval of the first. Based on the differences among the first set of search results and the second, different set of search results, information displayed in portions 218, 220, 22, 224, 226 (FIGS. 2A-2C) also differs, e.g., when displayed for the corresponding search results. Through selection of one of controls 210, 212, 214 (FIGS. 2A-2B), a user may cause the information displayed in portions 218, 220, 222, 224, 226 (FIGS. 2A-2C) to be updated in real-time, e.g., based on implementation of the techniques described herein. Iterative and/or periodic selection of controls 210, 212, 214 (FIGS. 2A-2B) causes updates and/or modifications to the information displayed in portions 218, 220, 222, 224, 226, e.g., as the search results on which this information is based may periodically change and or be modified in real-time by the search engines.

Figure 4:
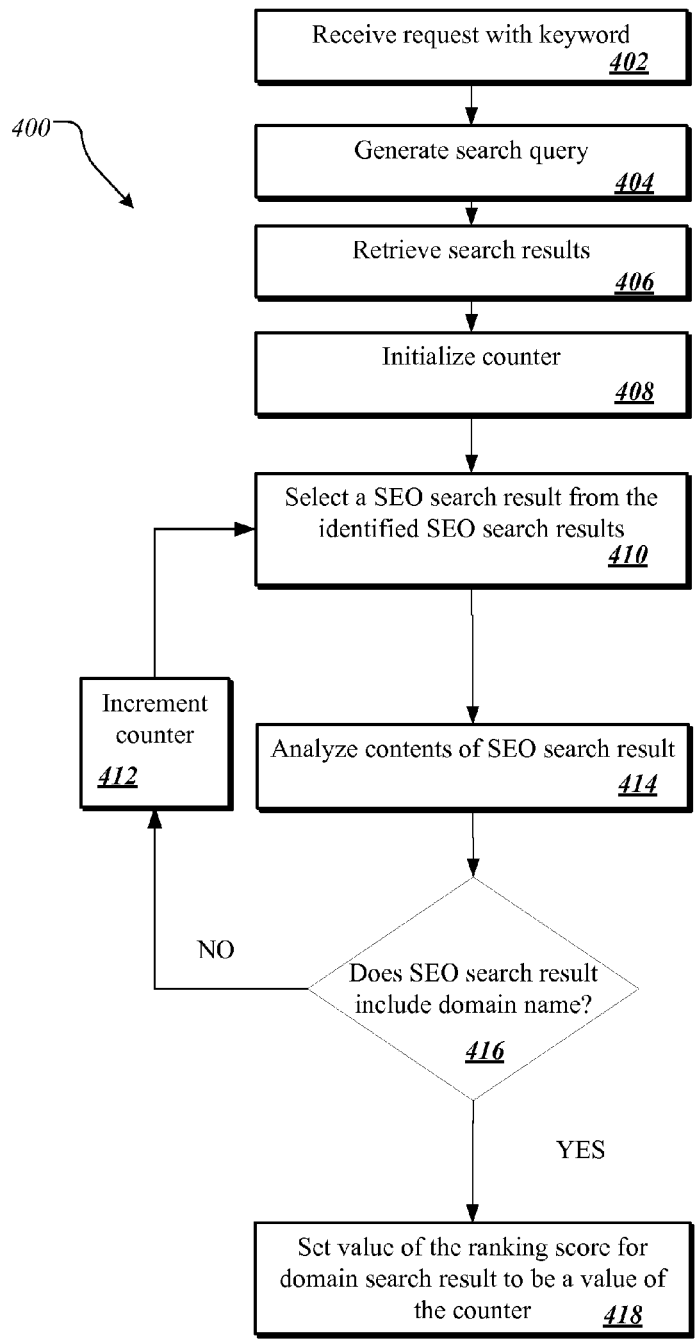
FIGS. 4 and 5 are flow charts useful in understanding the ranking retrieval system.

Referring to FIG. 4, ranking retrieval server 108 implements process 400 in determining a ranking score of a domain search result. In operation, ranking retrieval server 108 receives (402), from client device 104, a request. For example, ranking retrieval server 108 receives request 117 with domain information 118, keyword 116, and search engine information 132.

Using keyword 116, ranking retrieval server 108 (404) generates a search query for search results that are retrieved based on keyword 116. Ranking retrieval server 108 generates the search query using a syntax (e.g., HTML tags) and other formatting information used by the search engine specified by search engine information 132. Using the generated search query, ranking retrieval server 108 retrieves (406) search results from the search engine specified by search engine information 132.

Using the retrieved search results, ranking retrieval server 108 identifies (not shown) search engine optimization (SEO) search results. There are various types of search results, including, e.g., sponsored search results and SEO search results. A sponsored search result is a search result that is sponsored (e.g., paid for) by a content sponsor (e.g., an advertiser). A SEO search result is a search result that is selected by a search engine based on relevance of the search result to a search query and is independent of sponsorship of the search result by a content sponsor.

Ranking retrieval server 108 parses the retrieved search results to identify the sponsored search results and the SEO search results. Ranking retrieval server 108 uses pre-defined formatting of the search results to differentiate the sponsored search results from the SEO search results. The pre-defined formatting may include varies HTML tags (e.g., the HTML header tag) that are used by the search engine to separate sponsored search results from SEO search results in a web page.

Referring now to FIG. 4, ranking retrieval server 108 initializes (408) a counter to a value of zero. Ranking retrieval server 108 retrieves the SEO search results, from a search engine, in a specified order, e.g., based on a relevance of the SEO results to the search quest. Ranking retrieval server 108 executes actions 412, 414, 416 in accordance with the order in which the SEO search results are retrieved from the search. For example, ranking retrieval server 108 first executes actions 412, 414, 416 for a SEO search result that is ordered first (e.g., ranked highest) relative to other of the SEO search results. Ranking retrieval server 108 re-execute actions 412, 414, 416 for a SEO search result that is ordered second (e.g., ranked second) relative to other of the SEO search results.

Ranking retrieval server 108 selects (410) one of the SEO search results, e.g., starting from the first SEO search result and progressing onward to the second SEO search results, the third SEO search result, and so forth. For one of the SEO search results (e.g., a first one of the SEO search results), ranking retrieval server 108 analyzes (414) contents of the SEO search result. Based on the analysis, ranking retrieval server 108 determines (416) if the SEO search result includes the domain name specified in domain information 118 (and/or other information included in domain information 118). If the SEO search result includes the domain name specified in domain information 118, ranking retrieval server 108 identifies the SEO search result as being a domain search result. Ranking retrieval server 108 sets (418) a ranking score for the domain search result to equal the value of the counter. If the SEO search result does not include the domain name specified in domain information 118, ranking retrieval server 108 increments (412) a value of the counter by a value of one and repeats actions 410, 414, 416, e.g., until a SEO search result includes the domain name specified in domain information 118.

Figure 5:
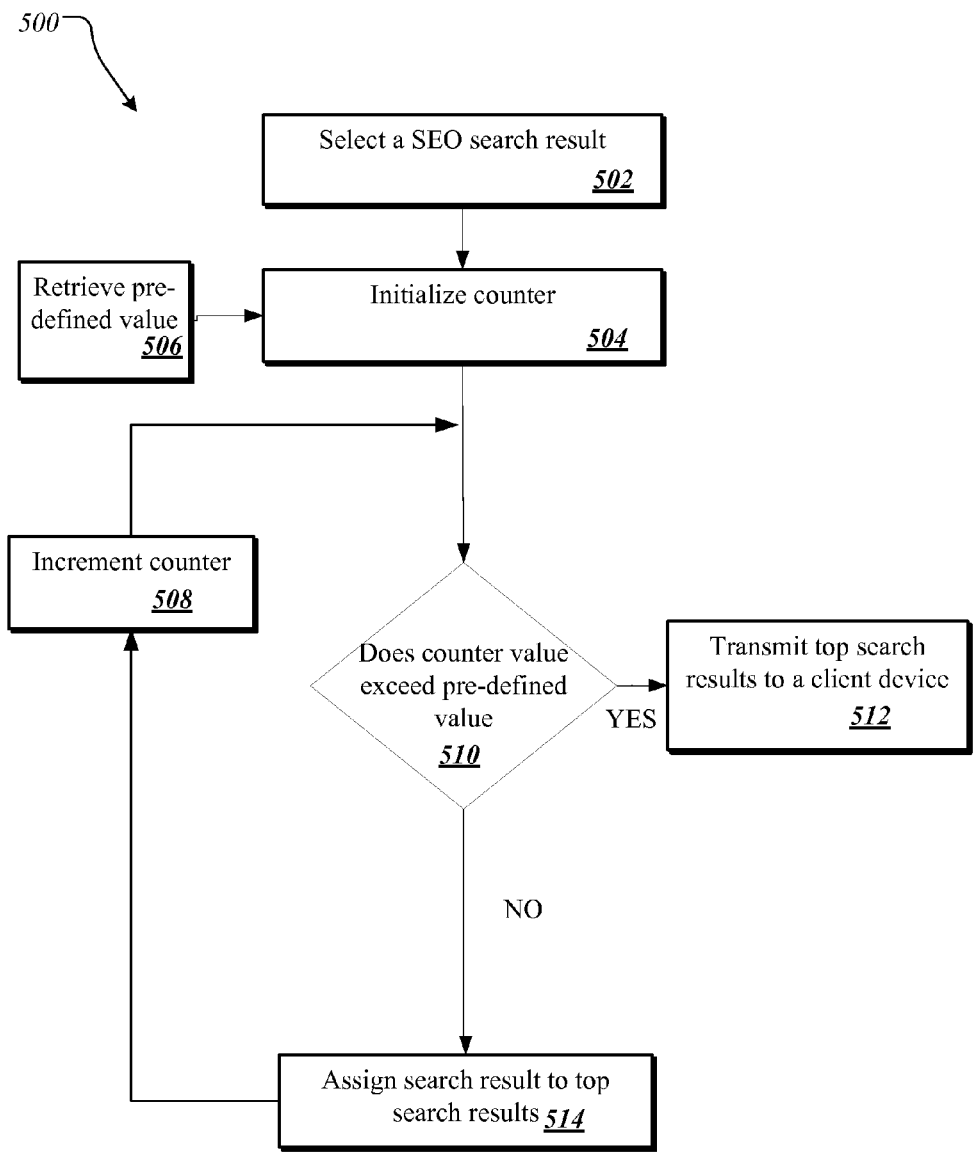

Referring to FIG. 5, ranking retrieval server 108 implements process 500 in determining a pre-defined number of top search results. In operation, ranking retrieval server 108 selects (502) a SEO search result, e.g., in accordance with an order in which the SEO search results are returned from a search engine. Ranking retrieval server 108 also retrieves (506), from data repository 110, a pre-defined value indicative of a number of top search results to be identified. Ranking retrieval server 108 also initializes (504) a value of a counter, e.g., to a value of one. Ranking retrieval server 108 determines (510) if the counter value exceeds the pre-defined value. If the counter value exceeds the pre-defined value, ranking retrieval server 108 determines that it has identified a specified number of top search results. Ranking retrieval server 108 transmits (512), to client device 104, the top search results (and/or information indicative of the top search results, e.g., information 228, 230, 232 in FIGS. 2A-2B).

If the counter value does not exceed the pre-defined value, ranking retrieval server 108 assigns (514) the SEO search result to the top search results. Ranking retrieval server 108 increments (508) a value of the counter by a value of one. Ranking retrieval server 108 re-executes actions 510, 514, 508, e.g., until ranking retrieval server 108 determines that the counter value exceeds the pre-defined value.

Figure 6:
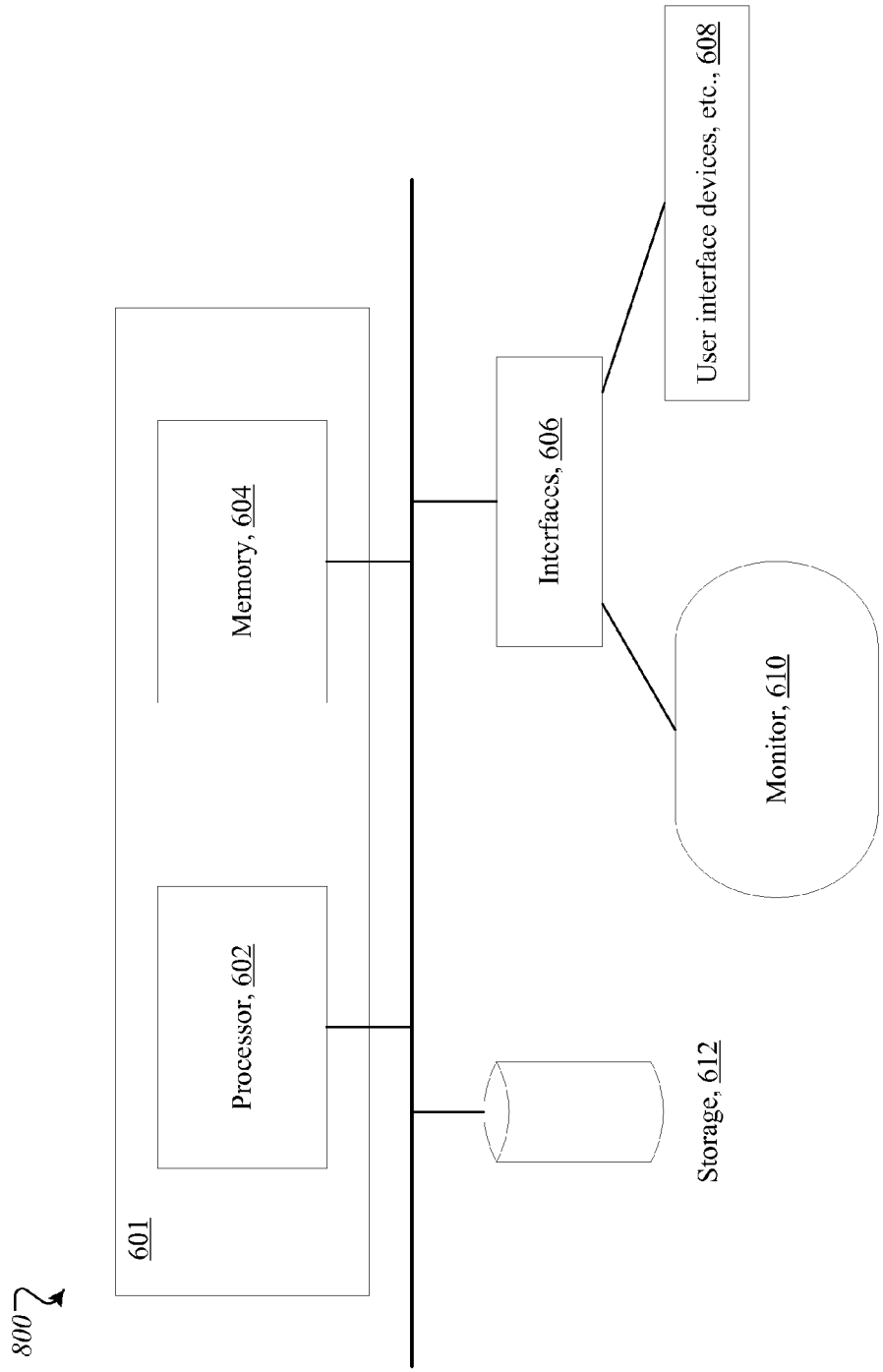
FIG. 6 is a block diagram of typical components for devices in the system of FIG. 1.

FIG. 6 shows details of components of device 601 used in system 100. In an example, device 601 includes a client device (e.g., client device 104). In another example, device 601 includes a server (e.g., server 108). Systems, servers and client devices will typically include a processor 602, memory 604, interfaces 806, storage 612, monitor 610, and user interface devices 608 such as a mouse, etc.

Device 601 can be any sort of computing device capable of taking input from a user and communicating over a network (not shown) with server 108 and/or with other client devices. For example, user devices can be a mobile device, a desktop computer, a laptop, a cell phone, a personal digital assistant ("PDA"), a server, an embedded computing system, a mobile device, a key fob device, and so forth. Client devices can include a monitor that renders visual representations.

Device 601 can also be a server, a distributed computing system, a rack-mounted server, and so forth. Device 601 may be a single server or a group of servers that are at a same location or at different locations.

Device 601 can receive information from a client device, including, e.g., graphical user interfaces. Interfaces 606 can be any type of interface capable of receiving information over a network, such as an Ethernet interface, a wireless networking interface, a fiber-optic networking interface, a modem, and so forth.

Device 601 also includes a processor 602 and memory 604. A bus system (not referenced) can be used to establish and to control data communication.

Processor 602 may include one or more microprocessors. Generally, processor 602 may include any appropriate processor and/or logic that is capable of receiving and storing data, and of communicating over a network (not shown). Memory 604 can include a hard drive and a random access memory storage device, such as a dynamic random access memory, machine-readable media, or other types of non-transitory machine-readable storage devices. Components 600 also include storage device 612, which is configured to store information collected through the brokerage system during a physician's consultation with a patient, as well as an operating system and application software.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A computer-implemented method comprising:
receiving, from a client device, information indicative of a keyword and information indicative of a user specified network domain of interest;
receiving, from search engine systems, search results for the keyword;
determining, by one or more computer systems a first search engine ranking score of a search result returned from a first one of the search engine systems and associated with the user specified network domain of interest;
determining by the one or more computer systems a second search engine ranking score of a search result returned from a second, different search engine system and associated with the user specified network domain of interest;
generating information for:
a first visual representation of information indicative of the search result from the first one of the search engine systems that is associated with the user specified network domain of interest; and
a second visual representation of information indicative of the search result from the second one of the search engine systems that is associated with the user specified network domain of interest;
selecting, from the received search results, a predefined number of search results for the keyword with increased search engine ranking scores relative to other search engine ranking scores for other retrieved search results for the keyword; and
transmitting to the client device information indicative of the selected predefined number of search results, the first visual representation and the second visual representation.

2. The method of claim 1, further comprising:
transmitting, to the client device, information indicative of at least a portion of the search results received.

3. The method of claim 1, further comprising:
generating information for a graphical user interface that when rendered on a display device, renders:
a first visual representation of a first control, selection of which causes the one or more computer systems to use the first one of the search engine systems in receiving the search results; and
a second visual representation of a second control, selection of which causes the one or more computer systems to use the second one of the search engine systems in receiving the search results.

4. The method of claim 1, further comprising:
transmitting, to the client device, information indicative of the first search engine ranking score and the second search engine ranking score.

5. The method of claim 1, wherein identifying the first search engine ranking score of the search result that is associated with the user specified network domain of interest comprises:
selecting, from search results received from the first one of the search engine systems, a search result for the user specified network domain of interest; and
determining, based on a ranking of the selected search result relative to other search results in the search results, the first search engine ranking score of the selected search result.

6. A computer program product tangibly stored on a computer readable storage device, the computer program product comprising instructions for causing a computer system to perform operations comprising:
receiving, from a client device, information indicative of a keyword and information indicative of a user specified network domain of interest;
receiving, from search engine systems, search results for the keyword;
determining, a first search engine ranking score of a search result returned from a first one of the search engine systems and associated with the user specified network domain of interest;
determining a second search engine ranking score of a search result returned from a second, different search engine system and associated with the user specified network domain of interest;
generating information for:
a first visual representation of information indicative of the search result from the first one of the search engine systems that is associated with the user specified network domain of interest; and
a second visual representation of information indicative of the search result from the second one of the search engine systems that is associated with the user specified network domain of interest;
selecting, from the received search results, a predefined number of search results for the keyword with increased search engine ranking scores relative to other search engine ranking scores for other retrieved search results for the keyword; and
transmitting to the client device information indicative of the selected predefined number of search results, the first visual representation and the second visual representation.

7. The computer program product of claim 6, wherein the operations further comprise:
transmitting, to the client device, information indicative of at least a portion of the search results received.

8. The computer program product of claim 6, wherein the operations further comprise:

generating information for a graphical user interface that when rendered on a display device, renders:
a first visual representation of a first control, selection of which causes the one or more computer systems to use the first one of the search engine systems in receiving the search results; and
a second visual representation of a second control, selection of which causes the one or more computer systems to use the second one of the search engine systems in receiving the search results.

9. The computer program product of claim 6, wherein the operations further comprise:
transmitting, to the client device, information indicative of the first search engine ranking score and the second search engine ranking score.

10. The computer program product of claim 6, wherein identifying the first search engine ranking score of the search result that is associated with the user specified network domain of interest comprises:
selecting, from search results received from the first one of the search engine systems, a search result for the user specified network domain of interest; and
determining, based on a ranking of the selected search result relative to other search results in the search results, the first search engine ranking score of the selected search result.

11. An apparatus comprising:
a processor; and
a computer program product stored on a computer readable storage device, the computer program product comprising instructions for causing the processor to perform operations comprising:
receiving, from a client device, information indicative of a keyword and information indicative of a user specified network domain of interest;
receiving, from search engine systems, search results for the keyword;
determining, a first search engine ranking score of a search result returned from a first one of the search engine systems and associated with the user specified network domain of interest;
determining a second search engine ranking score of a search result returned from a second, different search engine system and associated with the user specified network domain of interest;
generating information for:
a first visual representation of information indicative of the search result from the first one of the search engine systems that is associated with the user specified network domain of interest; and
a second visual representation of information indicative of the search result from the second one of the search engine systems that is associated with the user specified network domain of interest;
selecting, from the received search results, a predefined number of search results for the keyword with increased search engine ranking scores relative to other search engine ranking scores for other retrieved search results for the keyword; and
transmitting to the client device information indicative of the selected predefined number of search results, the first visual representation and the second visual representation.

12. The computer-implemented method of claim 1, wherein search engine ranking scores identify an order in which search results returned from a particular search engine system are displayed to a user, and wherein a particular search engine ranking score specifies a position of a particular search result in an ordered list of search results that are viewed by the user.

13. The computer program product of claim 6, wherein search engine ranking scores identify an order in which search results returned from a particular search engine system are displayed to a user, and wherein a particular search engine ranking score specifies a position of a particular search result in an ordered list of search results that are viewed by the user.

14. The apparatus of claim 11, wherein search engine ranking scores identify an order in which search results returned from a particular search engine system are displayed to a user, and wherein a particular search engine ranking score specifies a position of a particular search result in an ordered list of search results that are viewed by the user.

15. The method of claim 1, wherein the selected predefined number of search results include at least the search result that is returned from the second, different search engine and that is associated with the second search engine ranking score or the search result that is returned from the first search engine and that is associated with the first search engine ranking score.

16. The computer program product of claim 6, wherein the selected predefined number of search results include at least the search result that is returned from the second, different search engine and that is associated with the second search engine ranking score or the search result that is returned from the first search engine and that is associated with the first search engine ranking score.

17. The apparatus of claim 11, wherein the selected predefined number of search results include at least the search result that is returned from the second, different search engine and that is associated with the second search engine ranking score or the search result that is returned from the first search engine and that is associated with the first search engine ranking score.

* * * * *